April 14, 1925.  1,533,855
H. E. HARKIN
FUEL HEATER FOR INTERNAL COMBUSTION ENGINES
Filed Dec. 1, 1920
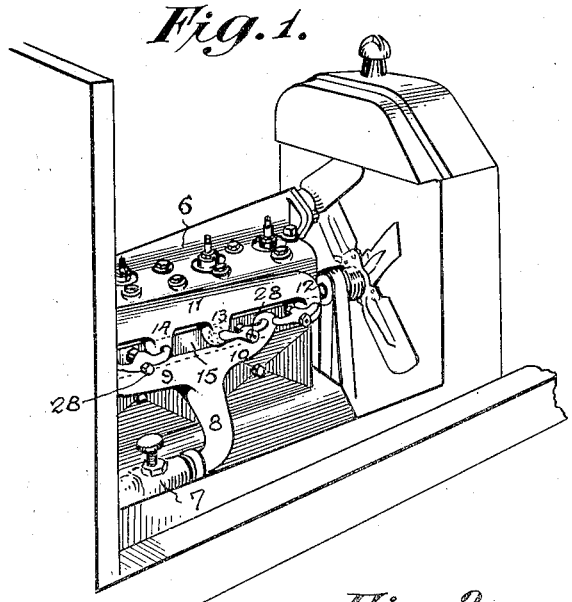
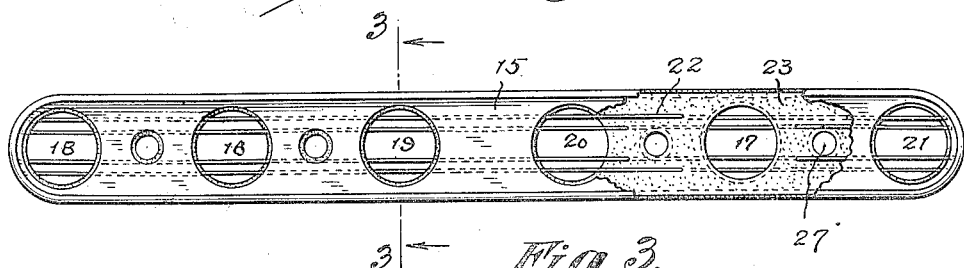
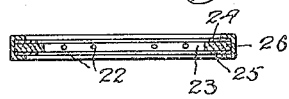
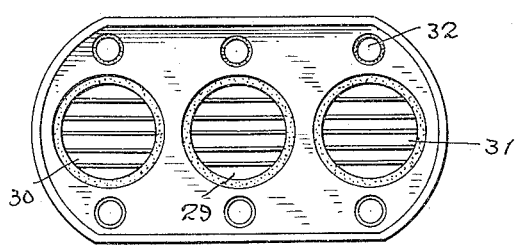
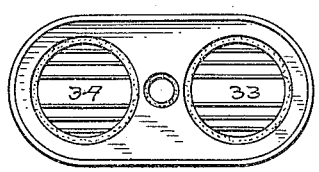
Inventor
Harry Everett Harkin
By his Attorneys Patented Apr. 14, 1925.

1,533,855

UNITED STATES PATENT OFFICE.

HARRY EVERETT HARKIN, OF RIDGEFIELD PARK, NEW JERSEY, ASSIGNOR OF ONE-HALF TO FREDERICK GEORGE KRONE, OF RIDGEFIELD PARK, NEW JERSEY.

FUEL HEATER FOR INTERNAL-COMBUSTION ENGINES.

Application filed December 1, 1920. Serial No. 427,610.

*To all whom it may concern:*

Be it known that I, HARRY EVERETT HARKIN, a citizen of the United States of America, residing at Ridgefield Park, in the county of Bergen and State of New Jersey, have invented certain new and useful Improvements in Fuel Heaters for Internal-Combustion Engines, of which the following is a specification.

My invention relates to a device for heating fuel for an internal combustion engine, and falls within the class of devices generally known as fuel heaters, the object of which is to render more efficient the explosive mixture commonly used in explosion engines. The particular object of my invention is to provide a fuel heater which serves to heat and simultaneously to further the intimate mixture of air and vapor which forms the explosive mixture. The specific form of fuel heater which I have devised and found most efficient comprises a wire grid arranged across the engine inlet port for the explosion mixture, and also across the exhaust port so that the heat of the exhaust gases is transmitted through the wire grid to the incoming explosive mixture at the inlet port. A convenient arrangement for the grid is afforded by a gasket arranged between the intake and exhaust manifolds at the engine head, as shown in the accompanying drawings, in which—

Fig. 1 is a perspective of an explosion engine of an automobile to which my invention is applied in gasket form;

Fig. 2 is a broken plan of a gasket detached and drawn to a larger scale;

Fig. 3 is a section on the line 3—3, Fig. 2; and

Figs. 4 and 5 are plans of gaskets of slightly different contour adapted for engines of different types now in common use.

It is to be understood, of course, that the present invention is susceptible of embodiment in various ways, and may be applied to engines of different types, and that the construction shown is merely a convenient practical embodiment of the invention which I have found efficient in actual service. I have shown in Fig. 1 an engine 6 of common type, having a group of four cylinders. The explosive mixture is fed to the cylinders from a carbureter 7 through an inlet manifold 8 having two branches 9 and 10, each branch serving two cylinders. The exhaust from the cylinders is received by an exhaust manifold 11, three ports 12, 13 and 14 of which are indicated in Fig. 1. In an engine of this type the inlet and exhaust ports are alined. This arrangement permits me to embody my invention in the form of a straight gasket 15 having a series of ports 16, 17, 18, 19, 20 and 21, corresponding to the inlet and exhaust ports of the manifolds 8 and 11. The ports 16 and 17 register with the ports of the inlet manifold branches 9 and 10. The ports 18, 19 and 20, 21 correspond to the ports of the exhaust manifold which, as will be noted, straddle the ports of the intake manifold. Extending across the series of ports 16 to 21 of the gasket is a grid of wires 22, of sufficient mechanical strength to withstand, even when heated, the rush of gases through the ports and being constituted of a metal which forms a ready conductor of heat. In the form here shown the wires are embedded in a filler sheet 23 of asbestos packing faced on opposite sides by plates 24 and 25 of metal, the elements of the gasket being retained by a marginal clamping ring or channel 26 pressed around the edges of the gasket. Holes 27 are provided intermediate the ports to receive the usual holding screw bolts 28, by which the manifolds are supported on the cylinder heads.

It is obvious that the exhaust gases passing out through the ports 18, 19 and 20, 21 heat the grid 22, and the latter being of metal, which is a good conductor of heat, transmits heat to the portions of the grid arranged at the inlet ports 16 and 17, so that the temperature of the gases passing through the inlet ports 16 and 17 is markedly raised, and its explosive capacity materially increased as it enters the cylinder. The grid has the secondary effect of breaking up any stratification of air and gas in the current flowing through the intake manifold 8 and thus insures that intimate commingling which is so desirable for the greatest efficiency of the explosive mixture. Moreover, the heat of the exhaust gases which are in direct contact with the grid, raises the temperature of the latter to the highest possible degree, and that heat is retained in the grid by the asbestos packing through which the grid passes directly to the intake ports. There is thus practically no opportunity for radiation losses. It may be further pointed out that the spacing of the grid wires is such as to cause no material throttling effect at the inlet and outlet ports.

The gasket just described is suitable for use with the explosion engine of a Ford car, in which the arrangement of the intake and exhaust manifolds is that indicated in Fig. 1. The gaskets shown in Figs. 4 and 5 are of similar construction, but of different shape, that of Fig. 4 being adapted to the head of a Marmon engine, in which the intake and exhaust ports are arranged in groups of three, the intake port 29 being straddled by the exhaust ports 30 and 31, and the holes 32 for the securing screws being arranged on opposite sides of each port and out of alinement therewith. The gasket of Fig. 5 is adapted to the engine of an Overland car, in which the inlet port 33 is juxtaposed to the exhaust port 34, but not straddled by a pair of exhaust ports, as in the other constructions above described.

Various other arrangements, and adaptation to engines of different construction, will readily occur to those dealing with the problem, without, however, departing from what I claim as my invention.

I claim—

1. A fuel heater for internal combustion engines comprising a wire grid extending across the inlet and exhaust ports of an explosion engine, and serving to transmit the heat of the exhaust therethrough to an explosive mixture contacting with the grid at the inlet port.

2. A fuel heater for internal combustion engines comprising a wire grid extending across the inlet and exhaust ports of an explosion engine, and serving to transmit the heat of the exhaust therethrough to an explosive mixture contacting with the grid at the inlet port, in combination with a heat-insulating medium in which said grid is embedded between the ports.

3. A fuel heater for internal combustion engines comprising a gasket adapted to be arranged between the engine and the intake and exhaust manifolds associated therewith, said gasket having ports registering with the intake and exhaust ports of the engine, in combination with a grid carried by the gasket and extending across the inlet and exhaust ports to transmit the heat of exhaust to the gases passing through the inlet port, substantially as described.

4. A fuel heater for internal combustion engines comprising a gasket adapted to be arranged between the engine and the intake and exhaust manifolds associated therewith, said gasket having ports registering with the intake and exhaust ports of the engine, in combination with a grid carried by the gasket and extending across the inlet and exhaust ports to transmit the heat of exhaust to the gases passing through the inlet port, together with a heat-insulating packing in which the grid is embedded.

5. A fuel heater for internal combustion engines comprising a gasket adapted to be arranged between the engine and the intake and exhaust manifolds associated therewith, and having ports registering with the intake and exhaust ports of the engine, said gasket comprising a pair of metallic plates on its opposite faces, an asbestos packing confined between said plates, and a heat-transmitting grid embedded in said packing and extending across the port openings in the gasket, substantially as described.

6. The combination with an explosion engine having inlet and exhaust ports, of a heat absorbing and transmitting element arranged across the exhaust and inlet ports of the engine and serving to heat the explosive mixture passing through the inlet port by the heat extracted by said element from the gases passing through the exhaust port.

7. The combination with an explosion engine having inlet and exhaust ports, of a heat absorbing and transmitting element arranged across the exhaust and inlet ports of the engine and serving to heat the explosive mixture passing through the inlet port by the heat extracted by said element from the gases passing through the exhaust port, together with means to prevent loss of heat by radiation from said element between said ports.

In testimony whereof I have signed my name to this specification.

HARRY EVERETT HARKIN.